United States Patent
Suryanarayana et al.

(10) Patent No.: US 10,757,006 B1
(45) Date of Patent: *Aug. 25, 2020

(54) ENHANCED TRAFFIC FLOW IN SOFTWARE-DEFINED NETWORKING CONTROLLER-BASED ARCHITECTURE

(71) Applicant: Juniper Networks, Inc., Sunnyvale, CA (US)

(72) Inventors: Anantharamu Suryanarayana, San Jose, CA (US); Harshad Bhaskar Nakil, Saratoga, CA (US); Nischal Kumar N. Sheth, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,416

(22) Filed: Feb. 4, 2019

Related U.S. Application Data

(63) Continuation of application No. 15/476,050, filed on Mar. 31, 2017, now Pat. No. 10,200,274.

(Continued)

(51) Int. Cl.
H04L 12/28 (2006.01)
*H04L 12/751* (2013.01)
*H04L 12/931* (2013.01)

(52) U.S. Cl.
CPC .............. *H04L 45/02* (2013.01); *H04L 49/70* (2013.01)

(58) Field of Classification Search
CPC ...... H04L 45/745; H04L 45/586; H04L 45/66
See application file for complete search history.

(56) References Cited

U.S. PATENT DOCUMENTS 7,130,304 B1 * 10/2006 Aggarwal ............... H04L 45/00
370/389
8,953,437 B1 * 2/2015 Tiruveedhula .......... H04L 45/50
370/218

(Continued)

FOREIGN PATENT DOCUMENTS

WO 2013/184846 A1 12/2013

OTHER PUBLICATIONS

Hoops, "Analysis of an Equal-Cost Multi-path Algorithm," RFC 2992, Network Working Group, Nov. 2000, 8 pp.

(Continued)

*Primary Examiner* — Zhiren Qin
(74) *Attorney, Agent, or Firm* — Shumaker & Sieffert, P.A.

(57) ABSTRACT

In one example, a method includes by a Software Defined Networking (SDN) controller, receiving one or more virtual routes to virtual interfaces from a first virtual router agent managed by the SDN controller, the one or more virtual routes received via a messaging protocol session between the SDN controller and the first virtual router agent; storing, by the SDN controller, the one or more virtual routes to a data structure; in response to determining the messaging protocol session has closed, marking, by the SDN controller, the one or more virtual routes in the data structure as stale without deleting the one or more virtual routes from the data structure and without withdrawing the virtual routes from routing protocol peers of the SDN controller; and subsequent to marking the one or more virtual routes as stale, sending, by the SDN controller, the one or more virtual routes to a second virtual router agent.

20 Claims, 8 Drawing Sheets

Related U.S. Application Data

(60) Provisional application No. 62/460,634, filed on Feb. 17, 2017.

(56) References Cited

U.S. PATENT DOCUMENTS

| | | | | |
|---|---|---|---|---|
| 9,294,304 | B2* | 3/2016 | Sindhu | H04L 12/4641 |
| 9,479,457 | B2* | 10/2016 | Sindhu | H04L 49/10 |
| 9,641,435 | B1 | 5/2017 | Sivaramakrishnan | |
| 10,200,274 | B1 | 2/2019 | Suryanarayana et al. | |
| 2006/0171404 | A1* | 8/2006 | Nalawade | H04L 45/28 370/401 |
| 2008/0031239 | A1* | 2/2008 | Kapoor | H04L 45/56 370/389 |
| 2012/0269198 | A1* | 10/2012 | Patel | H04L 45/021 370/400 |
| 2014/0003227 | A1* | 1/2014 | Scudder | H04L 45/021 370/218 |
| 2015/0381493 | A1* | 12/2015 | Bansal | H04L 45/745 370/392 |

OTHER PUBLICATIONS

Saint-Andre, "Extensible Messaging and Presence Protocol (XMPP): Core," RFC 6120, Internet Engineering Task Force, IETF, Mar. 2011, 211 pp.

Marques et al., "BGP-signaled end-system IP/VPNs. draft-marques-l3vpn-end-system-07," Network Working Group, Internet Draft, Aug. 2012, 20 pp.

Uttaro et al., "Support for Long-lived BGP Graceful Restart draft-uttaro-idr-bgp-persistence-03," Internet Engineering Task Force, IETF, Nov. 13, 2013, 23 pp.

"Juniper White Paper—Contrail Architecture," Juniper Networks, Inc., Sep. 2015, 44 pp.

Sangli et al., "Graceful Restart Mechanism for BGP," RFC 4724, Network Working Group, Jan. 2007, 15 pp.

Mackie et al., "BGP-Signaled End-System IP/VPNs draft-ietf-l3vpn-end-system-06," Network Working Group, Internet-Draft, Dec. 15, 2016, 31 pp.

\* cited by examiner

ENHANCED TRAFFIC FLOW IN SOFTWARE-DEFINED NETWORKING CONTROLLER-BASED ARCHITECTURE

This application is a continuation of U.S. application Ser. No. 15/476,050 filed Mar. 31, 2017, which claims the benefit of U.S. Provisional Application No. 62/460,634, filed Feb. 17, 2017, the entire contents of each of which are incorporated by reference herein.

TECHNICAL FIELD

The disclosure relates to computer networks and, more particularly, to forwarding packets within virtual networks.

BACKGROUND

In a typical cloud data center environment, there is a large collection of interconnected servers that provide computing (e.g., compute nodes) and/or storage capacity to run various applications. For example, a data center comprises a facility that hosts applications and services for customers of the data center. The data center for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Software Defined Networking (SDN) platforms may be used in data centers, and in some cases, may use a logically centralized and physically distributed SDN controller, and a distributed forwarding plane in virtual routers that extend the network from physical routers and switches in the data center into a virtual overlay network hosted in virtualized servers. The SDN controller provides management, control, and analytics functions of a virtualized network and orchestrates the virtual routers by communicating with the virtual routers. Losing communication between the SDN controller and the virtual routers may result in degraded or non-functional cloud-based services within the data center environment.

SUMMARY

In general, this disclosure describes techniques for decreasing disruption to traffic flow within Software Defined Networking (SDN) platforms when communication is lost between an SDN controller and virtual agents associated with virtual routers that implement a distributed forwarding plane for one or more virtual networks. The SDN controller and the virtual agents send and receive communications to share information about where to send traffic within the virtual networks to reach network destinations. The SDN controller also communicates configuration information to the virtual agents. In some examples, the SDN controller and the virtual agents communicate with each other using a messaging protocol, such as Extensible Messaging and Presence Protocol (XMPP), for example. This disclosure describes extensions to a messaging protocol for providing graceful restart functionality to decrease disruption to traffic flowing end-to-end within the virtual networks that might otherwise occur when a messaging protocol session goes down.

For example, rather than deleting, from stored routing or forwarding information, any virtual routes learned from a first messaging protocol endpoint over a now-closed messaging protocol session, a second messaging protocol endpoint (which may be the SDN controller or the virtual agent, in various examples) is configured to mark the virtual routes as "stale" routes that remain eligible for best-path selection and are still forwarded to other messaging protocol endpoints over other messaging protocol sessions. Moreover, rather than immediately withdrawing the virtual routes from routing peers to which the routes had been advertised (e.g., via a Border Gateway Protocol), the second messaging protocol endpoint marks the virtual routes as stale without withdrawing the routes from the routing peers. The virtual routes may be kept in the forwarding information for a configurable time period after the messaging protocol session is closed, enabling traffic to continue to be forwarded in the virtual network based on the virtual routes learned over the messaging protocol session. Even though some of the virtual routes may be changed or withdrawn during the time period, it is likely that many of the virtual routes are still current, and thus most traffic may be correctly forwarded by continuing to use the stale forwarding information.

In this manner, the overall impact to the network of the loss of messaging protocol session may be decreased while the session comes back up and routes are relearned. This enables cloud-based networking services to continue to function without packet loss for existing data flows even when SDN controllers and/or compute agents go down and possibly stay down for long periods of time. The techniques of this disclosure may provide one or more advantages. For example, the techniques enable the SDN controller and the virtual agents to exchange virtual routes using a light-weight messaging communications protocol, such as XMPP, while enabling virtual routers to continue forwarding traffic if the messaging communications protocol session goes down. The techniques avoid the need to rely on a more heavy-weight network protocol such as a Border Gateway Protocol (BGP) to provide graceful restart functionality by using a BGP session between the SDN controller and the virtual agents to exchange the virtual routes.

In one example, a method includes by a first network device operating as a messaging protocol client, receiving one or more virtual interfaces from a second network device operating as a messaging protocol server over a messaging protocol session between the first network device and the second network device; storing, by the messaging protocol client, the one or more virtual interfaces to a data structure; in response to the determining that the messaging protocol session has closed, marking, by the messaging protocol client, the one or more virtual interfaces in the data structure as stale without deleting the one or more virtual interfaces from the data structure; and subsequent to marking the indication of the one or more virtual interfaces as stale, advertising, by the first network device, the one or more virtual network interfaces to messaging protocol clients of the first network device relative to which the first network device operates as a messaging protocol server.

In another example, a method includes by a Software Defined Networking (SDN) controller, receiving one or more virtual routes to virtual interfaces from a first virtual router agent managed by the SDN controller, the one or more virtual routes received via a messaging protocol session between the SDN controller and the first virtual router agent; storing, by the SDN controller, the one or more virtual routes to a data structure; in response to determining the messaging protocol session has closed, marking, by the SDN controller, the one or more virtual routes in the data structure as stale without deleting the one or more virtual routes from the data structure and without withdrawing the virtual routes from routing protocol peers of the SDN controller; and subsequent to marking the one or more virtual routes as stale, sending, by the SDN controller, the one or more virtual routes to a second virtual router agent.

In another example aspect, a method includes receiving, by a virtual router agent of a compute node managed by a Software Defined Networking (SDN) controller, one or more virtual routes to virtual interfaces from the SDN controller via a messaging protocol session between the SDN controller and the virtual router agent; storing, by the virtual router agent, the one or more virtual routes to a data structure; in response to determining the messaging protocol session has closed, marking, by the virtual router agent, the one or more virtual routes in the data structure as stale without deleting the one or more virtual routes from the data structure; and subsequent to marking the one or more virtual routes as stale, forwarding, by a virtual router of the compute node, customer traffic to the virtual interfaces using the one or more virtual routes marked as stale.

In a further example aspect, a Software Defined Networking (SDN) controller includes a compute node executing a messaging protocol process configured to receive one or more virtual routes to virtual interfaces from a first virtual router agent managed by the SDN controller, the one or more virtual routes received via a messaging protocol session between the SDN controller and the first virtual router agent, wherein the compute node stores the one or more virtual routes to a data structure of the SDN controller; a routing protocol process configured to advertise the one or more virtual routes from the data structure to routing protocol peers of the SDN controller, wherein the messaging protocol process is configured to, in response to determining the messaging protocol session has closed, mark the one or more virtual routes in the data structure as stale without deleting the one or more virtual routes from the data structure and without notifying the routing protocol process to withdraw the virtual routes from the routing protocol peers; and wherein the messaging protocol process is configured to, subsequent to marking the one or more virtual routes as stale, send the one or more virtual routes to a second virtual router agent.

In another example, a compute node managed by a Software Defined Networking (SDN) controller includes a virtual router agent executing a messaging protocol; a plurality of virtual machines; and a virtual router forwarding plane comprising a plurality of forwarding information bases for the virtual machines, wherein the virtual router agent receives one or more virtual routes to virtual interfaces from the SDN controller via a messaging protocol session between the SDN controller and the virtual router agent; wherein the virtual router agent stores the one or more virtual routes to one or more of the plurality of forwarding information bases; wherein the virtual router agent marks, in response to determining the messaging protocol session has closed, the one or more virtual routes in the data structure as stale without deleting the one or more virtual routes from the forwarding information bases; and wherein the virtual router agent forwards, subsequent to marking the one or more virtual routes as stale, customer traffic to the virtual interfaces using the one or more virtual routes marked as stale.

The details of one or more examples are set forth in the accompanying drawings and the description below. Other features, objects, and advantages will be apparent from the description and drawings, and from the claims.

DETAILED DESCRIPTION

Figure 1:
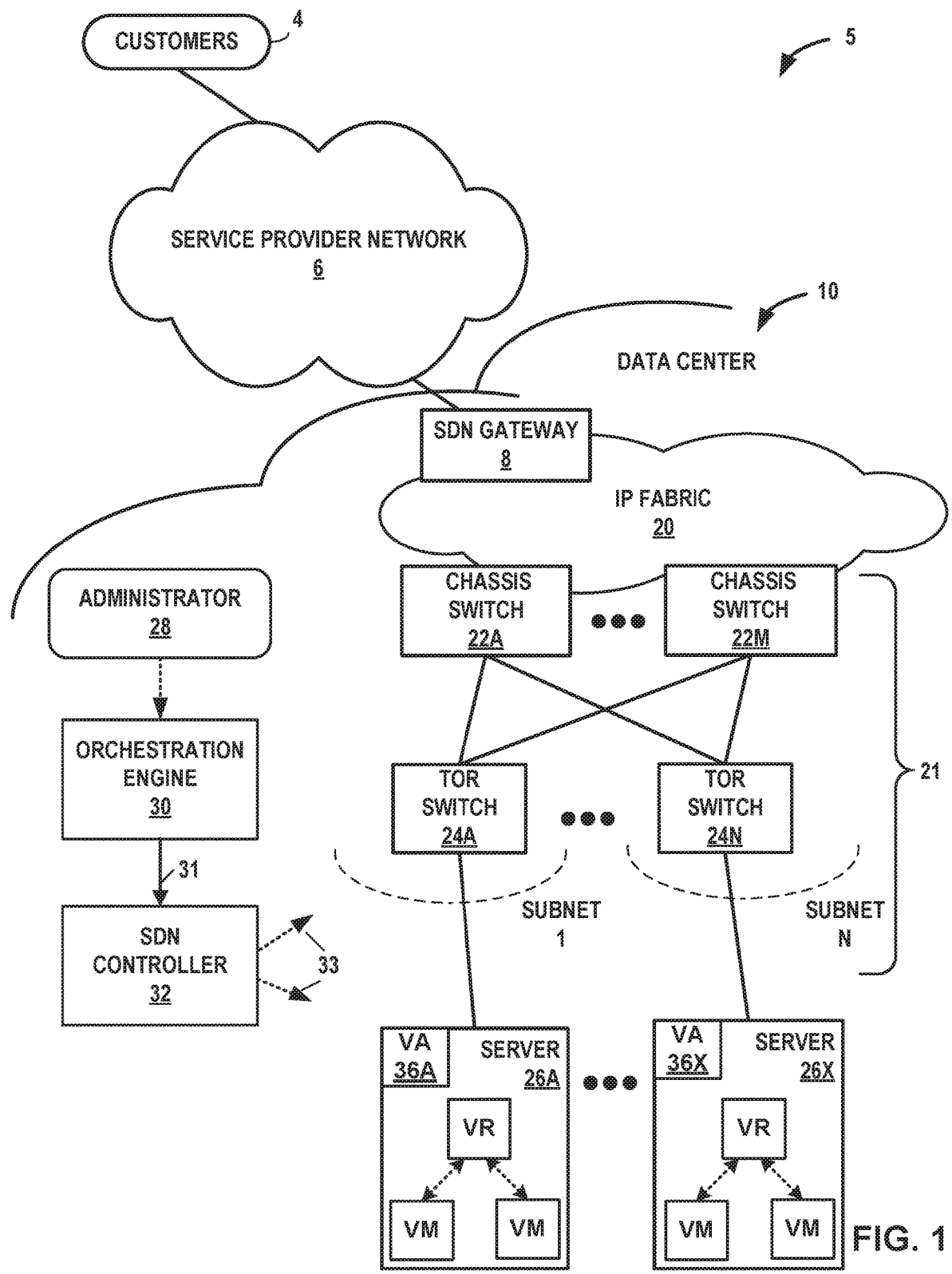
FIG. 1 is a block diagram illustrating an example network having a data center in which examples of the techniques described herein may be implemented.

FIG. 1 is a block diagram illustrating an example network 5 in which SDN controller 32 and virtual agents of servers 26A-26X ("servers 26") operate in accordance with the techniques described herein to ensuring customer traffic flow and customer applications executing within the cloud data center continue without interruption.

In general, data center 10 provides an operating environment for applications and services for customers 4 coupled to the data center 10 by service provider network 6. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via high-speed switch fabric 21 provided by one or more tiers of physical network switches and routers. Servers 26 function as compute nodes of the data center. In some examples, the terms "compute nodes" and "servers" are used interchangeably herein to refer to servers 26. For example, each of servers 26 may provide an operating environment for execution of one or more customer-specific virtual machines ("VMs" in FIG. 1). Switch fabric 21 is provided by a set of interconnected top-of-rack (TOR) switches 24A-24N (collectively, "TOR switches 24") coupled to a distribution layer of chassis switches 22A-22M (collectively, "chassis switches 22"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 24 and chassis switches 22 provide servers 26 with redundant (multi-homed) connectivity to IP fabric 20. Chassis switches 22 aggregate traffic flows and provides high-speed connectivity between TOR switches 24. TOR switches 24 are network devices that provide layer two (e.g., MAC) and/or layer 3 (e.g., IP) routing and/or switching functionality. TOR switches 24 and chassis switches 22 each include one or more processors and a memory, and that are capable of executing one or more software processes. Chassis switches 22 are coupled to IP fabric 20, which performs layer 3 routing to route network traffic between data center 10 and customers 4 by service provider network 6. Software-Defined Network ("SDN") gateway 8 acts to forward and receive packets between IP fabric 20 and service provider network 6.

SDN controller 32 provides a logically and in some cases physically centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32 operates in response to configuration input received from orchestration engine 30 via northbound Application Programming Interface (API) 31, which in turn operates in response to configuration input received from administrator 28. Additional information regarding SDN controller 32 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, SDN controller 32 manages the network and networking services such load balancing, security, and allocate resources from servers 26 to various applications via southbound API 33. That is, southbound API 33 represents a set of communication protocols utilized by SDN controller 32 to make the actual state of the network equal to the desired state as specified by orchestration engine 30. One such communication protocol may include a messaging protocol such as XMPP, for example. For example, SDN controller 32 implements high-level requests from orchestration engine 30 by configuring physical switches, e.g. TOR switches 24, chassis switches 22, and switch fabric 21; physical routers; physical service nodes such as firewalls and load balancers; and virtual services such as virtual firewalls in a VM. SDN controller 32 maintains routing, networking, and configuration information within a state database. SDN controller 32 communicates a suitable subset of the routing information and configuration information from the state database to virtual router (VR) agents 26A-26X ("VA" in FIG. 1) on each of servers 26A-26X.

Typically, the traffic between any two network devices, such as between network devices within IP fabric 20 (not shown) or between servers 26 and customers 4 or between servers 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of servers 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of server 26A, for instance, from the underlying physical network fabric may include an outer header to allow the physical network fabric to tunnel the payload or "inner packet" to a physical network address for a network interface of server 26 that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 26 may receive inbound tunnel packets of a packet flow from TOR switches 24 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 26 are described in U.S. patent application Ser. No. 14/228,844, entitled "PACKET SEGMENTATION OFFLOAD FOR VIRTUAL NETWORKS," incorporated herein by reference.

In the example of FIG. 1, SDN controller 32 learns and distributes routing and other information (such as configuration information) to all compute nodes in the data center 10. The VR agent 36 running inside the compute node, upon receiving the routing information from SDN controller 32, typically programs the data forwarding element (virtual router) with the forwarding information. SDN controller 32 sends routing and configuration information to the VR agent 36 using a messaging protocol such as XMPP protocol rather than using a more heavy-weight protocol such as a routing protocol like BGP. In XMPP, SDN controllers 32 and agents communicate routes and configuration over the same channel. SDN controller 32 acts as a messaging protocol client when receiving virtual routes from a VR agent 36, and the VR agent 36 acts as a messaging protocol server in that case. Conversely, SDN controller 32 acts as a messaging protocol server to the VR agent 36 as the messaging protocol client when the SDN controller sends routes to the VR agent 36.

According to the techniques of the disclosure, when a VR agent 36 detects an XMPP session with SDN controller 32 going down, rather than the VR agent 36 deleting all the information learned from SDN controller 32, which would negatively affect traffic flow among applicable endpoints, VR agent 36 retains the routing and configuration information learned from SDN controller 32. Forwarding elements such as VRs of servers 26 continue to forward the traffic as normal using the retained routing information. Stale information, such as one or more routes marked as stale, is likely to be refreshed by the SDN controller 32 if and when the XMPP session to SDN controller 32 comes back up. VR agents 36 maintain timers for each XMPP session, which the VR agents 36 use to purge entries from forwarding information or configuration information which is not refreshed by SDN controller 32 within a configured time period.

In the opposite case, VR agent 36 (acting as the XMPP Client) might fail. In the absence of the techniques of this disclosure, SDN controller 32 upon detecting VR agent 36 XMPP client failure may immediately delete all learned information from all other agents in a cluster. In contrast, using the techniques described herein, SDN controller 32 does not delete the routes upon determining an XMPP session between SDN controller 32 and VR agent 36 is down. Rather, if SDN controller 32 detects a VR agent 36A going down, SDN controller 32 refrains from deleting all the information learned from the VR agent 36A and withdrawing the routes from the rest of the network, which would otherwise cause traffic disruption for many data flows, and instead marks the information as stale routes that remain eligible for best-path election. In addition to not withdrawing the routes from BGP peers, SDN controller 32 continues to send the stale routes learned from VR agent 36A to other VR agents via other XMPP sessions, such as VR agent 36X, without identifying the routes as stale to VR agent 36X.

In this way, instead of sending a routing protocol message to SDN gateway 8 withdrawing virtual interface reachability information (routes) learned from VA 36A, SDN controller 32 refrains from sending such a routing protocol message and instead leaves the routes as they are in the network and treats the information as stale. The the learned routes are marked as stale and continued to be used by the rest of the network, including by SDN gateway 8. This gives time for the down VR agent 36 to come back up, and re-advertise the relevant routes. SDN controller 32 maintain timers for each XMPP session with the VR agents 36, which SDN controller 32 uses to purge entries from routing information that is not refreshed by the respective VR agent 36 within a configured time period.

In this way, SDN controller 32 and VR agent 36 are configured in a manner that enables the cloud networking to continue operating, even when SDN controller 32 or the VR agents 36 go down and stay down for long periods of time. Therefore, data center 10 ensures customer traffic flow and customer applications executing within the cloud data center continue without interruption when SDN controller 32, one of the VR agents 36 of servers 26, or a connection between them, goes down.

Figure 2:
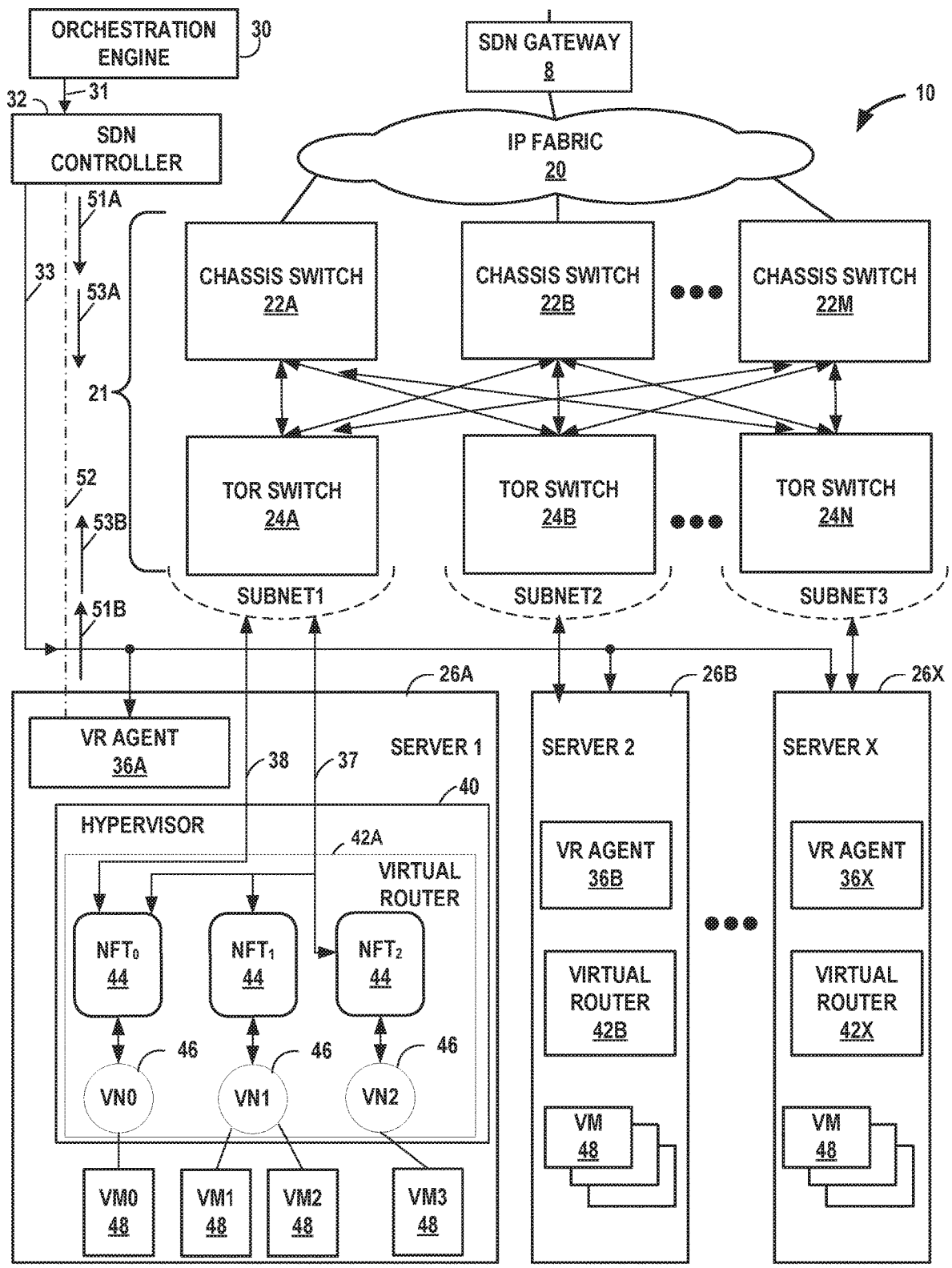
FIG. 2 is a block diagram illustrating an example implementation of the data center of FIG. 1 in further detail.

FIG. 2 is a block diagram illustrating an example implementation of data center 10 of FIG. 1 in further detail, in which SDN controller 32 and VR agents are configured to use a messaging protocol to provide graceful restart functionality within data center 10. In the example of FIG. 2, data center 10 includes an overlay network that extends switch fabric 21 from physical switches 22, 24 to software or "virtual" switches 42A-42X (collectively, "virtual routers 42"). Responsive to instructions received from SDN controller 32, virtual routers 42 dynamically create and manage one or more virtual networks 46 usable for communication between application instances.

In one example, virtual routers 42 execute the virtual network as an overlay network, which provides the capability to decouple an application's virtual address from a physical address (e.g., IP address) of the one of servers 26A-26X ("servers 26") on which the application is executing. Each virtual network may use its own addressing and security scheme and may be viewed as orthogonal from the physical network and its addressing scheme. Various techniques may be used to transport packets within and across virtual networks 46 over the physical network.

Each of virtual routers 42A-42X ("virtual routers 42") executes within a hypervisor, a host operating system, or other component of each of servers 26. Each of servers 26 represents an x86 or other general-purpose or special-purpose server capable of executing virtual machines 48. In the example of FIG. 2, virtual router 42A executes within hypervisor 40, also often referred to as a virtual machine manager (VMM), which provides a virtualization platform that allows multiple operating systems to concurrently run on one of servers 26. In the example of FIG. 2, virtual router 42A manages virtual networks 46, each of which provides a network environment for execution of one or more virtual machines (VMs) 48 on top of the virtualization platform provided by hypervisor 40. Each VM 48 is associated with one of the virtual networks VN0-VN1 and represents tenant VMs running customer applications such as Web servers, database servers, enterprise applications, or hosting virtualized services used to create service chains. In some cases, any one or more of servers 26 or another computing device hosts customer applications directly, i.e., not as virtual machines. Virtual machines as referenced herein, e.g., VMs 48, servers 26, or a separate computing device that hosts a customer application may be referred to alternatively as "hosts."

In general, each of VMs 48 may be any type of software application and is assigned a virtual address for use within a corresponding virtual network 46, where each of the virtual networks may be a different virtual subnet provided by virtual router 42A. A VM 48 may be assigned its own virtual layer three (L3) IP address, for example, for sending and receiving communications, but is unaware of an IP address of the physical server 26A on which the virtual machine is executing. In this way, a "virtual address" is an address for an application that differs from the logical address for the underlying, physical computer system, e.g., server 26A in the example of FIG. 2. The virtual addresses may also be referred to herein as "virtual interfaces."

In one implementation, each of servers 26 includes a corresponding one of VR agents 36A-36X that communicates with SDN controller 32 and, responsive thereto, directs virtual router 42 so as to control the overlay of virtual networks 46 and coordinate the routing of data packets within server 26. In general, each VR agent 36 communicates with SDN controller 32, which generates commands to control routing of packets through data center 10. Each of VR agents 36 may send messages to SDN controller 32 over XMPP sessions, the messages conveying virtual routes to the virtual interfaces (virtual addresses) of the VMs of servers 26. SDN controller 32 receives the messages and stores the virtual routes, and may in turn advertise one or more of the virtual routes from a first VR agent 36 to other VR agents 36. In some examples, any of the virtual routes may include a prefix, a next hop address associated with a server of servers 26, and a label or other data to identify a virtual routing and forwarding instance configured at the next hop server. A virtual route may include a Route Distinguisher (RD). Further details of BGP-signaled IP/VPNs are described in S. Mackie, BGP-signaled end-system IP/VPNs, Network Working Group Internet-Draft, Dec. 15, 2016, the entire contents of which are incorporated by reference herein.

VR agents 36 execute in user space and operate as a proxy for control plane messages between VMs 48 and SDN controller 32. For example, a VM 48 may request to send a message using its virtual address via the VR agent 36A, and VR agent 36A may in turn send the message and request that a response to the message be received for the virtual address of the VM 48 that originated the first message. In some cases, a VM 48 invokes a procedure or function call presented by an application programming interface of VR agent 36A, and the VR agent 36A handles encapsulation of the message as well, including addressing.

In some example implementations, each server 26A further includes an orchestration agent (not shown in FIG. 2) that communicates directly with orchestration engine 30. For example, responsive to instructions from orchestration engine 30, the orchestration agent communicates attributes of the particular VMs 46 executing on the respective server 26, and may create or terminate individual VMs.

In one example, network packets, e.g., layer three (L3) IP packets or layer two (L2) Ethernet packets generated or consumed by the instances of applications executed by virtual machines 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 42, e.g., within the hypervisor or the host operating system running on each of servers 26. As another example, encapsulation and decapsulation functions are performed at the edge of switch fabric 21 at a first-hop top-of-rack (TOR) switch 24 that is one hop removed from the application instance that originated the packet. This functionality is referred to herein as tunneling and may be used within data center 10 to create one or more overlay networks. Besides IP-in-IP, other example tunneling protocols that may be used include IP over GRE, VxLAN, MPLS over GRE, MPLS over UDP, etc.

As noted above, SDN controller 32 provides a logically centralized controller for facilitating operation of one or more virtual networks within data center 10. For example, SDN controller 32 maintains a routing information base, e.g., one or more routing tables that store routing information for the physical network as well as one or more overlay networks of data center 10. Similarly, chassis switches 22, TOR switches 24 and virtual routers 42 maintain routing information, such as one or more routing and/or forwarding tables. In one example implementation, virtual router 42A of hypervisor 40 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack.

For example, virtual machine VM1-48 may send an "inner packet," to virtual router 42A by an internal link. Virtual router 42A uses $NFL_1$ to look up a virtual network destination network address for the packet. $NFT_1$ specifies an outbound interface for virtual router 42A and encapsulation for the packet. Virtual router 30A applies the encapsulation to add a tunnel header to generate an outer packet and outputs the outer packet on the outbound interface, in this case toward TOR switch 24A.

The routing information, for example, maps packet key information (e.g., destination IP information and other select information from packet headers) to one or more specific next hops within the networks provided by virtual routers 42 and switch fabric 21. In some case, the next hops are chained next hops that specify a set of operations to be performed on each packet when forwarding the packet, such as may be used for flooding next hops and multicast replication. As shown in FIG. 2, each virtual network 46 provides a communication framework for encapsulated packet communications for the overlay network established through switch fabric 21. In this way, network packets associated with any of virtual machines 48 may be transported as encapsulated packet communications via the overlay network.

A connection may be lost between SDN controller 32 and one of VR agents 36 in various scenarios, such as due to the SDN controller 32 (or a control node therein) going down and having to restart, the VR agent 36 going down and having to restart, or a link between the two going down and communications having to be rerouted along a different functioning path. Different restarting entities may take different amounts of time to restart and stabilize. In accordance with the techniques of this disclosure, in some examples, information regarding how long an entity may take to restart and stabilize may be sent via the messaging protocol itself, e.g., by sending a new messaging protocol capabilities message.

For example, whenever a messaging protocol session is formed between SDN controller 32 and a VR agent 36 (e.g., over XMPP), each entity will advertise to the other the amount time it takes for the entity to gracefully restart. For example, SDN controller 32 may send to VR agent 36A, over an XMPP session 52, an XMPP capabilities message 51A indicating a graceful restart time associated with SDN controller 32. Similarly, VR agent 36A may send to SDN controller 32 over XMPP session 52 an XMPP capabilities message 51B indicating a graceful restart time associated with VR agent 36A. This exchange of XMPP capabilities messages gives an indication to the other end as to how long the receiver should keep the learned virtual routes as 'stale' before eventually purging them out. This time could be arbitrarily long, such as hours or days, to provide ample time to diagnose the problems and fix as necessary. For example, the receiving entity stores the capabilities information and uses this when setting its timers for a given messaging protocol session.

According to the techniques of the disclosure, when messaging protocol sessions between SDN controller 32 and a VR agent 36 goes down, SDN controller 32 does not delete the virtual routes learned from the VR agent 36 and also does not withdraw the virtual routes from advertised peers for certain period. Instead, the virtual routes are stored as is in routing information and just marked as 'stale' and SDN controller 32 sets a timer that causes SDN controller 32 to wait a time period before deleting the routes. Thus, if the session comes back up and routes are relearned, the overall impact to the network is significantly contained. Graceful-Restart and LongLivedGracefulRestart features may decrease an instantaneous disruption to traffic flowing end-to-end that would otherwise occur even when routes are kept inside vrouter kernel process (in data plane) intact.

If the VR agent 36 comes back up and the XMPP session 52 is restored before the timer expires, VR agent may re-send the virtual routes to the SDN controller 32. As the virtual routes are received, SDN controller 32 updates its routing information and removes the "stale" marker (flag) on virtual routes that have been re-learned. When VR agent 36 has sent all of the virtual routes, the VR agent 36 may send an End-of-Rib message 53A to SDN controller 32. This indicates the graceful restart process has ended. In response to receiving the EOR message 53A, SDN controller 32 stops the timer and deletes any routes that remain marked stale.

A similar process occurs in the opposite direction, where the VR agent 36 marks virtual routes as stale if the VR agent 36 detects its session 52 with SDN controller 32 has ended. SDN controller may likewise send an End-of-Rib message 53B to VR agent 36 after coming back up and having sent all the virtual routes that VR agent 36 had indicated an interest in receiving.

In this manner, according to the techniques of the present disclosure, SDN controller 32 and VR agents are configured to use a messaging protocol to provide graceful restart functionality within data center 10, therefore potentially decreasing service downtime and interruptions to its customers.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3:
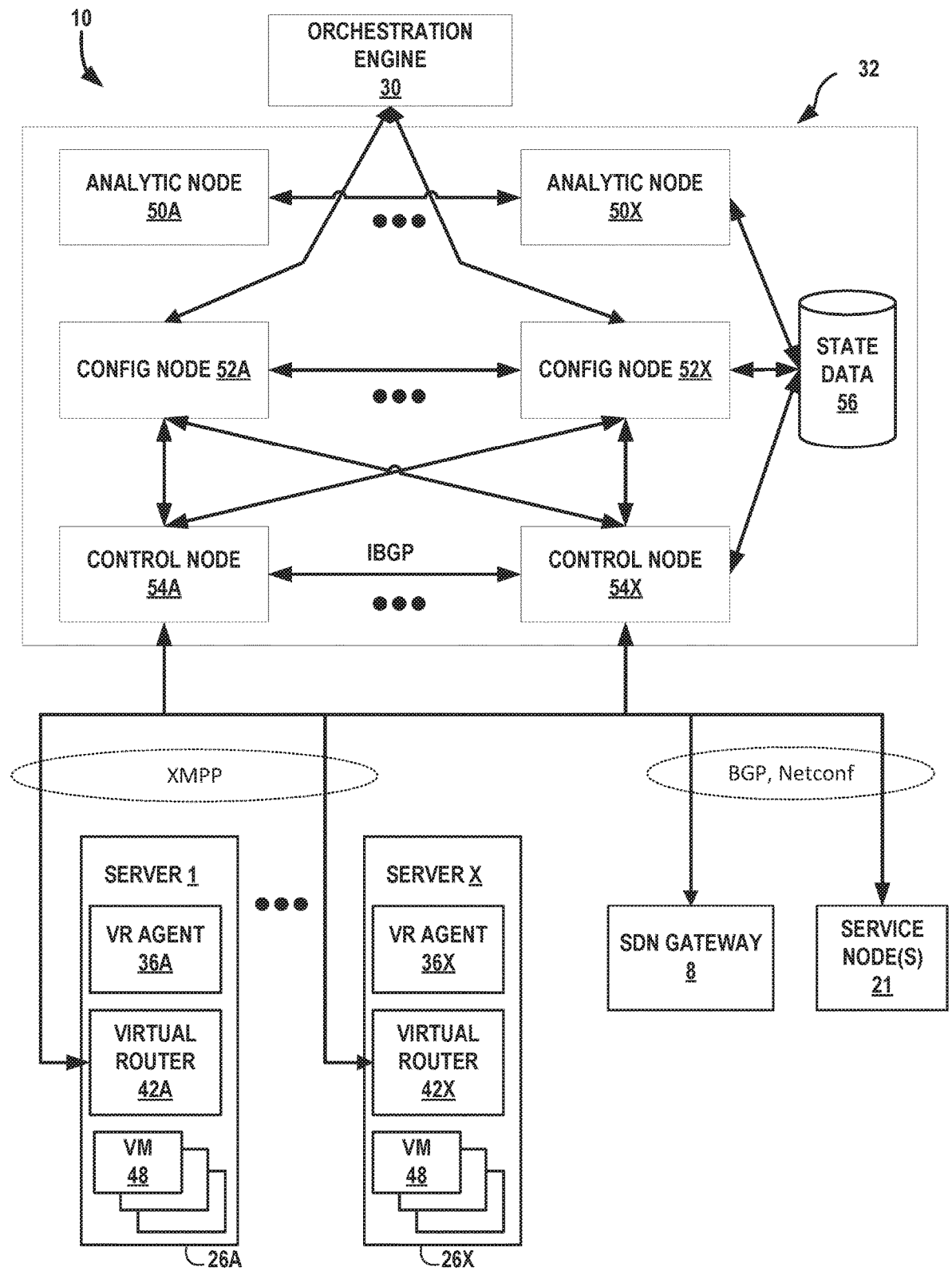
FIG. 3 is a block diagram illustrating an example implementation of the data center of FIG. 2 in further detail.

FIG. 3 is a block diagram illustrating an example implementation of the data center of FIG. 2 in further detail in which SDN controller 32 and VR agents 36 are configured to use a messaging protocol to allow for restarting of SDN controller 32 and VR agents 36 with less impact on network virtualization functions and data flow within the data center 10. In the example of FIG. 3, SDN controller 32 includes one or more analytic nodes 50A-50X (collectively, "analytic nodes 50"), one or more configuration nodes 52A-52X (collectively, "configuration nodes 52") and control nodes 54A-54X (collectively, "control nodes 54"). In general, each of the nodes 50, 52, and 52 may be implemented as a separate software process, and the nodes may be distributed across multiple hardware computing platforms that provide an environment for execution of the software. Moreover, each of the nodes maintains state data 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 30 into lower level models suitable for interacting with network elements, such as physical switches 22, 24 and VR agents 36. Configuration nodes 52 keep a persistent copy of the configuration state of SDN controller 32 within state database 56.

Control nodes 54 implement a logically centralized control plane responsible for maintaining ephemeral network state. Control nodes 54 interact with each other and with network elements, such as VR agents 36 and virtual routers 42 of servers 26, to ensure that the network state is eventually consistent with desired state as specified by orchestration engine 30. In general, control nodes 54 receive configuration state information of SDN controller 32 from configuration nodes 32, and exchange routes with each other via IBGP to ensure that all control nodes 54 have the same network state. Further, control nodes 54 exchange routes with VR agents 36 on servers 26 via XMPP. Control nodes 54 also communicate the configuration state information, such as routing instances and forwarding policy, to VR agents 36, e.g., via XMPP, for installation within respective virtual routers 42. In some examples, control nodes 54 may proxy traffic on behalf of servers 26. These proxy requests may be received over XMPP. Further, control nodes 54 exchange routes with SDN gateway 8 via BGP, and exchange the configuration state of SDN controller 32 with service nodes 21 via Netconf.

Configuration nodes 52 provide a discovery service that customers 4 may use to locate various services available within the network. For example, if VR agent 36A attempts a connection with control node 54A, it uses a discovery service provided by configuration nodes 52 to discover the IP address of control node 54A. Clients executing on VMs 48 may use local configuration, DHCP or DNS to locate the service discovery server within configuration nodes 52.

In some examples, configuration nodes 52 present northbound API that interfaces with orchestration engine 30. Orchestration engine 30 uses this interface to install configuration state using the high-level data model. Configuration nodes 52 further include a message bus to facilitate communications amongst internal components. Configuration nodes 52 further include a transformer that discovers changes in the high-level model of orchestration engine 30 and transforms these changes into corresponding changes in the low-level data model managed by SDN controller 32. Configuration nodes 52 further include an IF-MAP server that provides a southbound API to push computed low-level configuration down to control nodes 54. Furthermore, configuration nodes 52 include a distributed applications manager used to allocate unique object identifiers and to implement transactions across data center 10.

In the absence of the techniques of the disclosure, whenever an XMPP connection from a control node 54 of controller 32 to a VR agent 36 goes down, the control node 54 would delete all routes learned by the control node 54 from that VR agent 36 from state data 56. The control node 54 would also withdraw all routes learned from the VR agent 36 from all other peers, including other VR agents 36 communicating via other XMPP sessions, and BGP peers such as SDN gateway 8. This causes traffic loss end-to-end even if a virtual router 42 associated with the VR agent 36 going down still has routes retained in the data plane for hit-less forwarding until new session comes up and routes are re-learned and re-advertised again to other peers. The extensions described herein to a messaging protocol provide added support in control nodes 54 to retain routes learned from VR agents 36 when an XMPP session goes down, with the assumption that the XMPP session may come back up.

In accordance with the techniques of this disclosure, each of the control nodes 54 may be configured to employ a "mark and sweep" approach to retain and later purge routes. Routes are marked as stale and later purged if they have not been updated by the time a graceful restart timer associated with the XMPP session expires. More specifically, whenever a control node 54 detects that an XMPP session is closed (e.g., which may happen due to the VR agent 36 becoming unresponsive), control node 54 marks as stale all routes learned from VR agent 36 associated with the closed session with a stale flag in state data 56. The stale routes are still retained in the routing table and still eligible for best path election, outbound advertisement, etc. The control node 54 also triggers a GR timer to begin after a configurable time period (e.g., 1 minute). This time period before the GR timer is triggered to begin may be referred to as a GR wait period. If and when control node 54 detects that the session comes back up, and relearns some or all paths from the resumed session, control node 54 clears the stale flag (only for those relearned paths). When the GR timer expires, control node 54 walks the table again and any paths that are still marked as Stale are swept (deleted) from the table by the control node 54.

In some examples, control nodes 54 are configured such that during the GR wait time (when the timer has not yet fired), subsequent session flaps may be considered double failures and in response control node 54 deletes all paths without performing the graceful restart mark and sweep process. In other examples, control nodes 54 may instead be configured to retain routes and remain in GR mode even after multiple session closures, providing long-lived graceful restart functions.

The architecture of data center 10 illustrated in FIG. 3 is shown for purposes of example only. The techniques as set forth in this disclosure may be implemented in the example data center 10 of FIG. 3, as well as other types of data centers not described specifically herein. Nothing in this disclosure should be construed to limit the techniques of this disclosure to the example architecture illustrated by FIG. 3.

Figure 4:
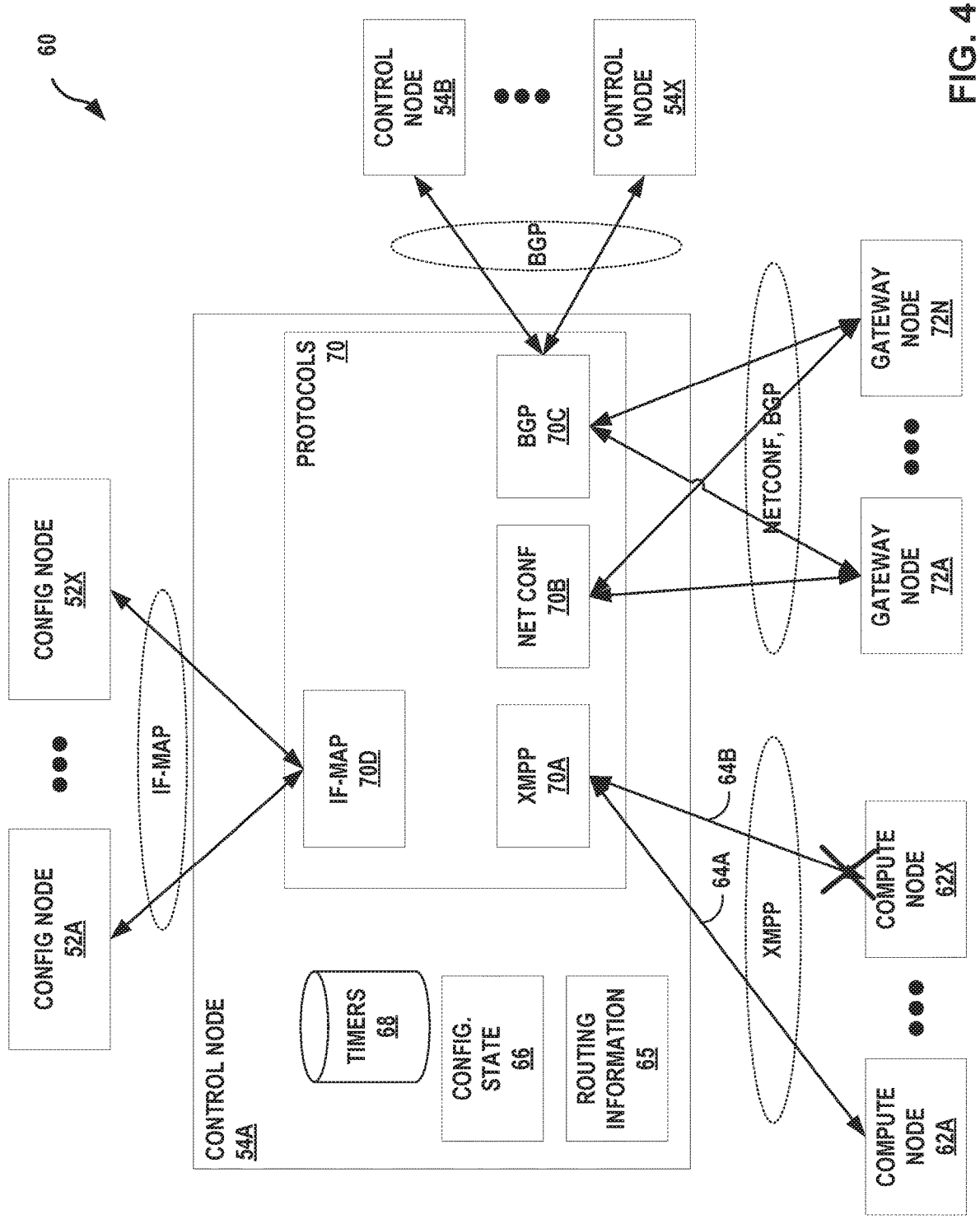
FIG. 4 is a block diagram illustrating an example of a control node of an SDN controller in further detail in accordance with the techniques of this disclosure.

FIG. 4 is a block diagram illustrating an example of a control node of an SDN controller in further detail in accordance with the techniques of this disclosure. Control node 54 is configured to communicate with multiple other types of nodes, including configuration nodes 52A-52X ("config. nodes 52"), other control nodes 54B-54X, compute nodes 62A-62X ("compute nodes 62"), and gateway nodes 72A-72N ("gateway nodes"). Control node 54A provides an operating environment for protocols 70 to execute. Protocols 70 may include, for example, an XMPP process 70A, a NETCONF protocol process 70B, a BGP process 70C, and an IF-MAP process 70D.

The control nodes receive configuration state from the configuration nodes using IF MAP. The control nodes exchange routes with other control nodes using IBGP to ensure that all control nodes have the same network state. The control nodes exchange routes with the vRouter agents on the compute nodes using XMPP. The control nodes also use XMPP to send configuration state such as routing instances and forwarding policy. The control nodes proxy certain kinds of traffic on behalf of compute nodes. These proxy requests are also received over XMPP. The control nodes exchange routes with the gateway nodes (routers and switches) using BGP. The control nodes also send configuration state using NETCONF.

Control node 54A receives configuration information from one or more of config. nodes 52 using Interface to Metadata Access Points (IF-MAP) process 70D. IF-MAP process 70D may include circuitry for executing software instructions for sending and receiving communications from config nodes 52 in accordance with the IF-MAP protocol. IF-MAP process 70D stores the configuration information received from configuration nodes 52 to configuration state 66 ("CONFIG. STATE 66").

Control node 54A exchanges BGP messages with BGP peers, including control nodes 54B-54X and gateway nodes 72 using BGP process 70C. Gateway nodes 72 may include one or more SDN gateways such as SDN gateway 8. BGP process 70C may include circuitry for executing software instructions for sending and receiving BGP messages with control nodes 54B-54X in accordance with the BGP protocol. BGP process 70C stores routing information received from BGP route advertisements from gateway nodes 72 and control nodes 54B-54X to routing information 65.

Control node 54A exchanges messages with compute nodes using XMPP process 70A in accordance with XMPP. Control node 54A exchanges the messages via XMPP sessions 64A-64B ("XMPP sessions 64"). Compute nodes 62 may correspond to servers 26 of FIGS. 1-3. XMPP process 70A may include circuitry for executing software instructions for exchanging XMPP messages with compute nodes 62 in accordance with the XMPP protocol. XMPP is described in further detail in P. Saint-Andre, Extensible Messaging and Presence Protocol (XMPP): Core, IETF RFC 6120, March 2011, the entire contents of which is incorporated by reference herein. Control node 54A (and more specifically, XMPP process 70A of control node 54A) may serve as an XMPP client or an XMPP server relative to one of compute nodes 62, depending on the context. For example, control node 54A may act as an XMPP server, and compute nodes 62 may be XMPP clients that subscribe to information published by control node 54A, such as configuration information from configuration state 66 for individual compute nodes 62 and routing information from routing information 65 that pertains to individual compute nodes 62. As another example, control node 54A may act as an XMPP client to one or more of compute nodes 62 as XMPP servers, in which control node 54A subscribes to information published by compute nodes 62, such as routing information learned by compute nodes 62 from other sources. XMPP process 70A receives routes from compute nodes 62A via XMPP session 64A and stores the routes to routing information 65. Routes learned by XMPP process 70A may be leaked to BGP process 70C, and BGP process 70C in turn may send to its BGP peers BGP routing advertisements that advertise the routes in routing information 65 learned from compute nodes 62 via XMPP. In some examples, NET CONF process 70B of control node 54A enables control node 54A to communicate with gateway nodes 72 via the Net Conf protocol.

In accordance with the techniques of this disclosure, XMPP process 70A is configured to operate using extensions to XMPP that enable improved operation when communication is lost with a node acting as an XMPP server. In the example of FIG. 4, compute node 62X has stopped operating and stopped responding to control node 54A. Compute node 62X may have gone down/offline due to a hardware or software failure, for example. XMPP process 70A detects that the XMPP session 64B between control node 54A and compute node 62X has gone down when XMPP process 70A does not receive XMPP communications from compute node 62X as expected. In response to detecting that the XMPP session 64B between control node 54A and compute node 62X has gone down, XMPP process 70A may mark as stale any routes in routing information 65 that XMPP process 70A learned from compute node 62X, without deleting the routes or withdrawing the routes from BGP peers (e.g., control nodes 54 or gateway nodes 72). XMPP process 70A sets a corresponding one of timers 68 that corresponds to the session. Timers 68 run for configurable time periods. In this manner, control node 54A allows compute node 62A to continue to forward data traffic to one of the virtual interfaces while the messaging protocol session 64B with the compute node 62X is closed and the routes received from compute node 62X are marked as stale. Control node 54 also allows BGP peers to continue to forward data traffic based on the routes.

For example, XMPP process 70A of SDN controller 54A may send to compute nodes 62, over an XMPP sessions 64, XMPP capabilities messages indicating a graceful restart time associated with SDN controller 54A. XMPP process 70A may obtain the graceful restart time and/or LLGR restart time to send from config. state 66, in some examples (as configured by one of config nodes 52 received via IF-MAP 70D). In some examples, the GracefulRestart or LLGR timer interval may be configured via via web-UI/API in schema.

In addition, XMPP process 70A of SDN controller 54 may receive from compute nodes 62 XMPP capabilities messages indicating graceful restart times associated with each of the compute nodes 62. When XMPP process 70A receives the XMPP capabilities messages, XMPP process 70 stores the graceful restart times for each of the XMPP sessions 64 (e.g., to config. state 66). The time periods for each of timers 68 will be set for the graceful restart times received via the XMPP capabilities messages.

As XMPP process 70A receives updated virtual routes via XMPP sessions 64 from a compute node such as compute node 62X that had restarted, XMPP process 70A updates the virtual routes in routing information 65 to remove the stale flag from any virtual routes that have been relearned in the updated virtual routes. XMPP process 70A is also configured to send and receive an End of RIB message to/from the compute node via the XMPP sessions, as described herein. When XMPP process 70A receives the end of RIB message from a compute node indicating that the compute node has reached an end of the virtual routes sent, XMPP process 70A walks through the routes in routing information 65 and deletes any virtual routes for which a stale flag remains. If an End of RIB message is not received before the expiration of the timer 68 associated with the XMPP session 64, XMPP 70A deletes from routing information 65 all stale virtual routes from the XMPP session.

With long-lived graceful restart (LLGR) mode is in effect, stale routes can be retained for much longer time than allowed by GR alone. In this mode, route preference is brought down and best paths are recomputed. Also, LLGR STALE community is tagged for stale paths and re-advertised. However, if NO LLGR community is associated with any received stale route, then such routes are not kept and are instead deleted. After a certain time, if the session comes back up, any remaining stale routes are deleted. If the session does not come back up, all retained stale routes are permanently deleted and withdrawn from advertised peers. These operations may be performed by both the SDN controller and the virtual router agent.

Figure 5A:
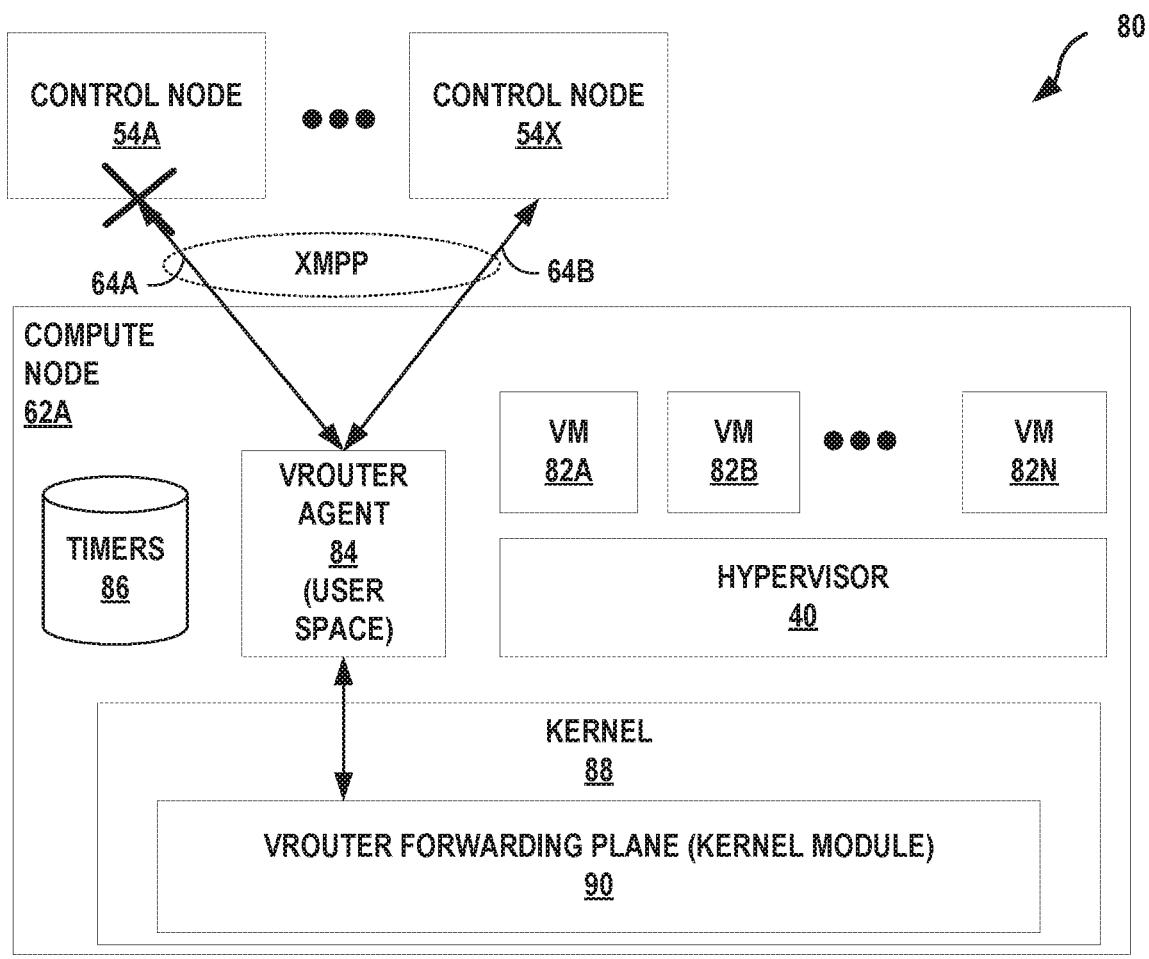
FIGS. 5A-5B are block diagrams illustrating examples of a compute node in further detail in accordance with the techniques of this disclosure.
Figure 5B:
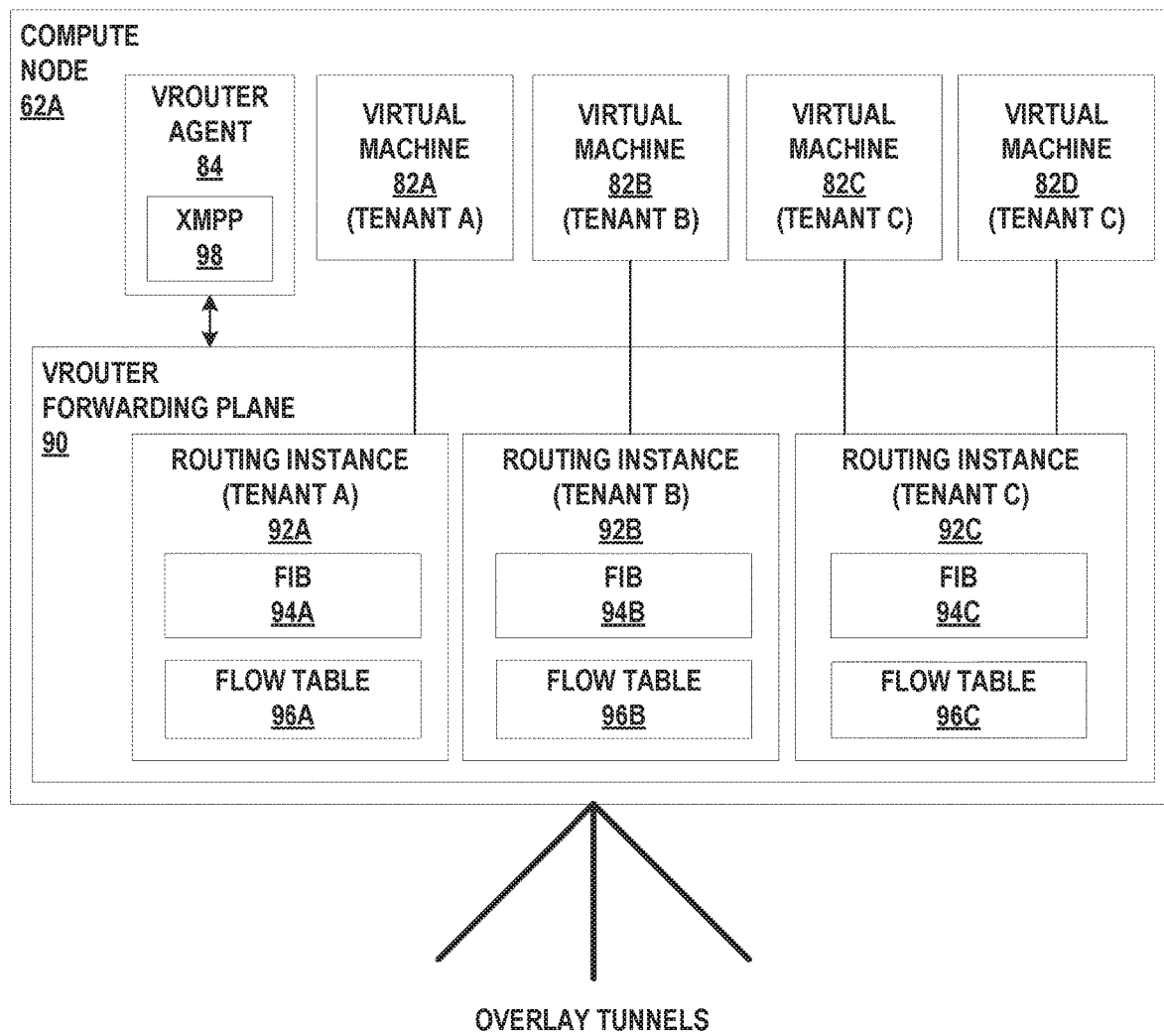

FIGS. 5A-5B are block diagrams illustrating examples of a compute node in further detail in accordance with the techniques of this disclosure. In the example of FIGS. 5A-5B, the compute node is compute node 62A of FIG. 4. Compute node 62A may be one of servers 26 of FIGS. 1-3. Compute node 62A hosts VMs 82A-82N ("VMs 82"), and may be, for example, a general-purpose x86 server. VMs 82 are tenant VMs running customer applications such as Web servers, database servers, enterprise applications or hosting virtualized services used to create service chains, for example. In one example configuration, Linux is the host operating system (OS).

Two components in a compute node implement a virtual router; namely, the vRouter agent 84 and the vRouter forwarding plane 90. The vRouter forwarding plane 90 sits in the kernel (e.g., Linux), and the vRouter agent 84 is the local control plane.

The vRouter agent 84 is a user space process running inside the kernel. The vRouter agent 84 acts as the local, lightweight control plane and is responsible for the following functions. The vRouter agent 84 exchanges control state such as routes with the control nodes 54 using XMPP sessions 64A, 64B. The vRouter agent 84 receives low-level configuration state such as routing instances and forwarding policy from the control nodes 54 using XMPP. The vRouter agent 84 reports analytics state such as logs, statistics, and events to the analytics nodes 50 (FIG. 3). The vRouter agent 84 installs forwarding state into the vRouter forwarding plane 90. The vRouter agent 84 may discover the existence and attributes of VMs in cooperation with a Nova agent of compute node 62A (not shown). The vRouter agent 84 applies forwarding policy for the first packet of each new flow and installs a flow entry for the flow in the flow table of the forwarding plane. The vRouter agent 84 may proxy one or more of DHCP, ARP, DNS, and MDNS, for example. Additional proxies may be included in some implementations. Each vRouter agent 84 is connected to at least two control nodes 54 for redundancy in an active-active redundancy model.

FIG. 5B illustrates the vRouter Forwarding Plane 90 of compute node 62A in further detail. The vRouter forwarding plane 90 runs as a loadable kernel process (e.g., in Linux). The vRouter forwarding plane 90 is responsible for the following functions: vRouter forwarding plane 90 enables encapsulating packets to be sent to the overlay network and decapsulating packets to be received from the overlay network. The vRouter forwarding plane 90 assigns packets to a routing instance. Packets received from the overlay network are assigned to a routing instance based on the MPLS label or Virtual Network Identifier (VNI). Virtual interfaces to local virtual machines are bound to routing instances. The vRouter forwarding plane 90 does a lookup of the destination address in the forwarding information base (FIB)—also known as a forwarding table—and forwards the packet to the correct destination. The routes may be Layer 3 IP prefixes or Layer 2 MAC addresses, for example.

A forwarding policy can be applied using a flow table 96: The vRouter forwarding plane 90 matches packets against the flow table and applies the flow actions. The vRouter forwarding plane 90 sends the packets for which no flow rule is found (that is, the first packet of every flow) to the vRouter agent 84, which then installs a rule in the flow table 96. The vRouter forwarding plane 90 sends certain packets such as DHCP, ARP, MDNS to the vRouter agent for proxying.

VRouter agent 84 uses XMPP process 98 to establish an XMPP session with a control node of the SDN controller. In accordance with the techniques of this disclosure, in the initial stage of negotiating the XMPP session, XMPP process 98 sends a Capabilities message to the control node, indicating a graceful restart time period (and/or LLGR time period) for the vRouter agent.

XMPP process 98 of VR agent 84 may be configured to send to compute nodes of SDN controller over XMPP sessions 64 an XMPP capabilities message indicating a graceful restart time and/or LLGR restart time associated with VR agent 84. XMPP process 98 of VR agent 84 may also receive an XMPP capabilities message from the compute nodes indicating their GR restart times. XMPP process 98 uses the GR restart times to set the time intervals for timers 86. This exchange of XMPP capabilities messages gives an indication to the other end as to how long the receiver should keep the learned virtual routes as 'stale' before eventually purging them out.

XMPP process 98 of Vrouter agent 84 learns virtual interfaces (virtual addresses) from VMs 82, and stores these as virtual routes for the virtual interfaces to FIBs 94. XMPP process 98 sends XMPP messages via the XMPP session to control nodes 54 to advertise the virtual routes. In addition, the vRouter agent 84 XMPP process 98 receives virtual routes advertised by SDN controller's control node 54A, and stores the virtual routes to one or more of FIBs 94. Some of the virtual routes advertised by the SDN controller may be stale routes, but SDN controller does not advertise them as such as described herein.

As XMPP process 98 receives updated virtual routes via XMPP sessions 64 from a control node such as control node 54A that had restarted, XMPP process 98 updates the virtual routes in the appropriate one of FIBS 94 to remove the stale flag from any virtual routes that have been relearned in the updated virtual routes. XMPP process 98 is also configured to send and receive an End of RIB message to/from the control node via the XMPP sessions, as described herein. For example, where VR agent 84 goes down and after VR agent 84 restarts and sends routes to all instances across all address families, VR agent 84 sends EoR marker to trigger termination of GR process sooner. This may prevent possible traffic black-holing until GR timer expiry.

When XMPP process 98 receives the end of RIB message from a compute node indicating that the control node has reached an end of the virtual routes sent, XMPP process 98 walks through the routes in routing information 65 and deletes any virtual routes for which a stale flag remains. If an End of RIB message is not received before the expiration of the timer 68 associated with the XMPP session 64, XMPP process 98 deletes from routing information 65 all stale virtual routes from the XMPP session.

In accordance with the techniques of this disclosure, the vRouter agent 84 detects that an XMPP session with control node 54A has gone down. The vRouter agent 84 may act as an XMPP client to control node 54A in receiving routes and configuration information from control node 54A via the XMPP session 64A between control node 54A and vRouter agent 84. In response to detecting that the XMPP session 64A with the control node has 54A gone down, vRouter agent 84 marks as "stale" any routes learned by vRouter agent 84 from control node 54A via XMPP session 64A.

In accordance with the techniques of this disclosure, XMPP may be extended to include messages that are used to exchange capability information between the two end-points of the session. The two end-points may exchange the capability messages when waiting in 'XmppOpenConfirmed' state during initial XMPP session establishment, for example. For example, a capability message sent by control node 54A of SDN controller 32 may indicate an amount of time the control node may take to restart. As another example, a capability message sent by a virtual router agent 84 may indicate an amount of time the vRouter agent 84 may take to restart. In response to detecting that the XMPP session 64A goes down, the entity receiving the capability message may set a timer associated with the XMPP session 64A to be equal to or greater than the amount of time indicated in the received capability message, and may wait until expiration of the timer before deleting/withdrawing any routes received via the XMPP session.

Normally, each end-point sends an XmppOpen message to the other end-point, enters an XmppOpenSent state, and waits for the reception of the open message (sent from the other end-point). After receiving the open message, each entity goes to "OpenConfirmed" state and then sends an XmppKeepAlive message. Only after receiving the first keep alive message does the state moves to the final state 'Established'. The end-points send the new capabilities message when waiting in the 'OpenConfirmed' state. (Before sending the first KeepAlive message). This keeps backward compatibility and also enables custom messages that do not violate the Xmpp chat message protocol. Capabilities may have only GracefulRestart information. In some examples, the Capabilities may have other types of information besides GracefulRestart information. Example:

```
<capabilities>
    <capability>
        <type>GracefulRestart</type>
        <parameters>
            <!-- Restart Time in seconds -->
            <restart-time>300</restart-time>
            <!-- Long Lived Restart Time in seconds -->
            <long-lived-restart-time>10000</long-lived-restart-time>
            <!-- GR supported Address families list -->
            <address-families>
                <family>
                    <!-- Address family type -->
                    <inet-unicast/>
                    <!-- Whether forwarding state has been preserved or not -->
                    <forwarding-state-preserved>yes</forwarding-state-preserved>
```

```
        </family>
        <family>
            <!-- Address family type -->
            <inet6-unicast/>
            <!-- Whether forwarding state has been
    preserved or not -->
                <forwarding-state-preserved>yes</forwarding-
            state-preserved>
        </family>
        </address-families>
    </parameters>
    <capability>
</capabilities>
```

In some examples, control node 54 is configured to, after a control node 54 goes down and restarts, send to VR agent 36 an XMPP message having an End-of-Rib marker to indicate when all routes have been sent by the control nodes 54. The term "RIB" stands for routing information base, e.g., routing information 65 data structure. The VR agent 36 can delete routes learned earlier over the XMPP session with the control note that remain flagged as stale when the End-of-Rib marker is received. Similarly, the control nodes 54 can terminate its graceful restart process when the control node 54 receives an End-of-Rib marker from a VR agent 36 that had previously restarted, instead of always waiting on the GR timer to expire before deleting routes that remain flagged as stale. This may help in reducing traffic black-holing, as stale routes are purged more quickly (as opposed to only purging so based on a timer, though this timer value can be tuned via configuration). In some examples, the control nodes 54 may also send "End-of-Config" marker in an XMPP message to the VR agents 36 when all configuration has been sent to the VR agent 36 over the XMPP session/channel.

In some examples, the End-Of-Rib marker may be exchanged using an empty items list in an XMPP update message. Examples for sending the End-Of-Rib marker from the VR agent 36 to the control node of the SDN controller are as follows:

```
<iq type='set'
    from='agent@vnsw contrailsystems com/other-peer'
    to=vbgp.contrail.com'>
    <pubsub xmlns=vhttp://jabber.org/protocol/pubsubv>
        <!--0/0 indicates eor to all afis, or to specific afi/safi
        otherwise-->
        <items node="0/0/End-of-Rib"></items>
    </pubsub>
</iq>
<?xml version="1.0"?>
<iq                                                  type="set"
    from="agent0@vnsw.contrailsystems.com"
    to="network-control@contrailsystems.com/bgp-
    peer">
    <pubsub xmlns="http://jabber.org/protocol/pubsub">
    <publish/>
    </pubsub>
</iq>
```

Examples for sending the End-Of-Rib marker from the control node 54 of the SDN controller to the VR agent 36 are as follows:

```
<iq type='set' from='bgp.contrail.com'
    to=' agent@vnsw.contrailsystems.com/bgp-peer'>
    <event xmlns="http://jabber.org/protocol/pubsub">
        <!--0/0 indicates eor to all afis, or to specific afi/safi
        otherwise-->
        <items node="0/0/End-of-Rib"></items>
```

```
    </event>
</iq>
<?xml version="1.0"?>
<iq                                                  type="set"
    from="agent0@vnsw.contrailsystems.com"
    to="network-control@contrailsystems.com/bgp-
    peer">
    <pubsub xmlns="http://jabber.org/protocol/pubsub">
    <collection/>
    </pubsub>
</iq>
```

Some example operations for using the End-of-Rib marker and the End-Of-Config markers are as follows: 1. VR agent should send the End-of-Rib marker after determining that End-Of-Config marker is received, all received configuration has been processed and all originated routes has been advertised to control node 54. 2. control node 54 should send End-of-RIB marker to agent after determining that all routes a VR agent is interested is in have been advertised to the VR agent. 3. In examples where logic to send/receive a particular marker is not implemented, a timer can be used to deduce the same. This timer may be configurable to tune based on deployment scenarios.

In some examples, control nodes 54 and VR agents 84 may be configured to handle LLGR Cases. For example, control nodes 54 and VR agents 84 may be configured to, when sessions flap in GR TIMER state, cancel the timer and restart the graceful restart (GR) process all over again. This allows to mark newly sent (partial) routes as stale. In some examples, control nodes 54 and VR agents 84 may be configured to handle nested closure cases as well. Eventually whenever the GR timer fires, control nodes 54 or VR agents 84 keep and sweep routes if the session is established, and deletes otherwise.

Control node 54 may also be configured to handle route-targets cleanup. When the new session comes up, control node 54 retains most of the old connection's data structures. Only XmppSession and XmppStateMachine may be switched from the new connection to the old.

In some examples, control nodes 54 and VR agents 84 may have the option to configure the GR timers on a per-peer basis. In some examples, control nodes 54 and VR agents 84 may have the option to configure GR ability on a per-peer basis.

In some examples, control nodes 54 may also be configured to deal with configuration changes that occur during the midst of the GR process. For example, control nodes 54 may also be configured to handle routing-instance deletions that occur during the GR process. When GR is in progress, the XMPP process retains all routes and subscription states (in BgpXmppChannel) in caes the VR agent 36 (84) re-subscribes after GR. But if the configuration changes between the time VR agent 36 went down and came back up, new VR agent 36 may not re-subscribe to all the instances it had subscribed before. Such sticky subscriptions must also be cleaned up properly by the XMPP process using mark and sweep approach (similar to how routes are handled). BgpXmppChannel gets necessary callback for: when to mark all subscription states as stale; if agent re-subscribes after restart, control node 54 clears the stale flag in the subscription state; and when to sweep all subscription states (and delete still stale entries).

For example, only after all (still) stale subscription states are deleted, does the routing-instance deletion process resume and complete. During GR, control nodes 54 and VR agents 84 may be configured to retain all route-targets, similar to how routes are retained. In some examples, the route-target entries are not individually marked stale (and then swept). Instead, control nodes 54 and VR agents 84 may handle this by marking the subscription states which is already maintained on a per instance basis in BgpXmpp-Channel.

In some examples, control nodes 54 and VR agents 84 may be configured to not attempt graceful restart if the peer is deleted or administratively held down. During GR, we duplicate subscription requests may sometimes occur. In this case, control nodes 54 and VR agents 84 may be configured to clear the stale state, as agent did re-subscribe after restart.

In some examples, the XMPP process of control nodes 54 and VR agents 84 may be configured to associate with a XmppConnectionEndpoint and handle the case where it already has another XmppConnection from the same Endpoint. Note that the XmppConnection is not marked duplicate since it's already on the ConnectionMap.

In some examples, the XMPP process of control nodes 54 and VR agents 84 may be configured to find or create an XmppConnectionEndpoint for the Endpoint of the given XmppConnnection. If XmppConnectionEndpoint is already associated with a XmppConnection, the XMPP process returns null to indicate that the XmppConnection should be terminated. Otherwise, the XMPP process associates the XmppConnectionEndpoint with the given XmppConnection. The XMPP process will process XmppStream header message received over a session. The XMPP process closes the stream if an old session is still present and undergoing graceful restart.

The XMPP process updates "To" information which can be used to map an older session, and looks for an endpoint which may already exist. If an older endpoint is present and is still associated with XmppConnection, the XMPP process checks if the older connection is under graceful-restart. If GR is not supported, then the XMPP process closes all new connections until the old connection is completely deleted. Even if GR is supported, new connection may not be accepted by the XMPP process until the old connection is fully cleaned up. The XMPP process brings down the old session if it is still in established state. This is the scenario in which the old session's TCP process did not learn of the session down event, possibly due to a compute node cold reboot, for example. In that case, the XMPP process triggers closure (and possibly GR) process for the old session.

The XMPP process resurrects an old xmpp connection if it is present (when under GracefulRestart). During Graceful Restart (or otherwise), new connections may not not be rejected in ProcessStreamHeaderMessage( ) itself until the old connection's cleanup process is complete and the system is ready to start a new session. Hence in here, when called upon receipt of OpenMessage, the XMPP process can try to reuse old XmppConnection if present and there by complete any pending GR process.

The XMPP process does so by reusing XmppConnection, XmppChannel, etc. from the old connection and only use the XmppSession and XmppStateMachine from the new session. The XMPP process instead associates the new connection with the old state machine and session, and triggers their deletion. For example:
  void    XmppStateMachine::ResurrectOldConnection (XmppConnection*new  connection,  XmppSession*new session) {
The XMPP process looks for an endpoint (which is a persistent data structure) across XMPP session flips. If this is a new endpoint, then there is no older connection to manage. There is no connection associated with older endpoint. The XMPP process treats the connection as if a new endpoint being created. The XMPP process retrieves old XmppConnection and XmppStateMachine (to reuse). The XMPP process swaps old and new connections and state machines linkages. The XMPP process updates XmppConnections from the sessions. The XMPP process swaps the old XMPP session with the new one. The XMPP process triggers deletion of the new connection (which now is linked with the old_state_machine and old_xmpp_session. The XMPP process feeds session events into the state machine.

In some examples, the upgrade impact of the GR functionality may be as follows. In some examples, a control-plane upgrade (ISSU) is not impacted when GR is enabled because during ISSU, control node 54A forms a BGP peering with control node 54B during the time of the upgrade. Once the upgrade is complete, this peering is de-configured and hence any GR possibly in effect in control node 54A or in control node 54B is destroyed. Agent-upgrade may impact this feature. For example, during ISSU, agents may flip peering from v1 control node 54A to v2 control node 54A or v1 agent remains connected to v1 control node 54A and v2 agent remains connected to v2 control node 54A. In any case, the session must be closed non-graceful when switching over from v1 to v2, or vice-versa during roll-back because of downgrade.

In some examples, the GR/LLGR feature with a peer comes into effect either to all negotiated address-families or to none, i.e., if a peer signals support to GR/LLGR only for a subset of negotiated address families (Via bgp GR/LLGR capability advertisement), then GR helper mode does not come into effect for any family among the set of negotiated address families GR/LLGR is not supported for multicast routes. In some examples, GR/LLGR helper mode may not work correctly for EVPN routes, if the restarting node does not preserve forwarding state.

Vrouter Head-Less mode was introduced as a resilient mode of operation for VR Agent. When running in Headless mode, the VR agent will retain the last "Route Paths" from the Controller. The "Route Paths" are held by the XMPP process till a new stable connection is established to one of the Controller. Once the XMPP connection is up and is stable for a pre-defined duration, the "Route Path" from old XMPP connection are flushed. When Headless mode is used along with graceful-restart helper mode, the vrouter can forward "east-west" traffic, i.e., traffic sent directly between vrouters, for current and new flows (for already learned routes) even if all control-nodes go down and remain down in the cluster. If graceful restart helper mode is also used in SDN gateways, "north-south" traffic between the SDN gateway and Vrouters can also remain uninterrupted in headless mode.

Figure 6:
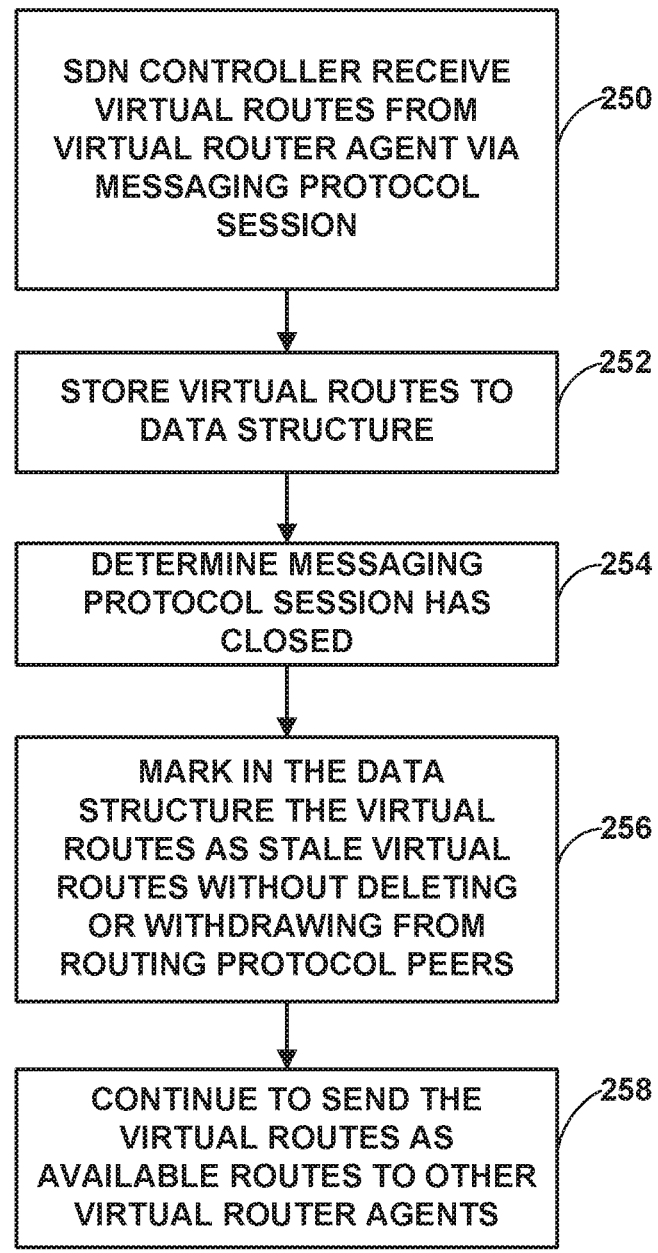
FIGS. 6 and 7 are flowcharts illustrating example operation of network devices in accordance with the techniques of this disclosure.

FIG. 6 is a flowchart illustrating example operation of network devices in accordance with the techniques of this disclosure. FIG. 6 will be described with reference to FIGS. 1-5 for purposes of example. An SDN controller such as SDN controller 32 receives virtual routes from a virtual router agent such as VR agents 36, 84 via a messaging protocol session, e.g., an XMPP session (250). The SDN controller 32 stores the virtual routes to a data structure, such as a routing information base, for example (252). The SDN controller 32 determines the messaging protocol session has closed (254), such as by failing to receive communications over the messaging protocol session for a pre-defined time period. The session may close due to, for example, the virtual router agent failing. In response to determining the messaging protocol session has closed, the SDN controller marks the virtual routes that were received from the virtual router agent in the data structure as stale routes, such as by setting a flag associated with the virtual router agent in routing information (256).

The SDN controller does not delete the stale virtual routes or withdraw the stale virtual routes from routing protocol peers (e.g., gateway nodes or other control nodes). The SDN controller continues to send the stale virtual routes as available routes to other virtual router agents for use by the other virtual router agents in forwarding customer traffic using the virtual routes (258). In so doing, the SDN controller may not identify the stale virtual routes as stale when sending them to the other virtual router agents. The SDN controller may set a timer associated with the messaging protocol session upon detecting the session has closed, and the SDN controller may delete any stale virtual routes that have not yet been updated by the virtual router agent by the time the timer expires. In some examples, the SDN controller may select a time period for the timer based on a time specified in a capabilities message received from the virtual router agent when the messaging protocol session is being established. The operations described above as being done by SDN controller may be performed by an XMPP process executing on a control node of the SDN controller, in some examples.

Figure 7:
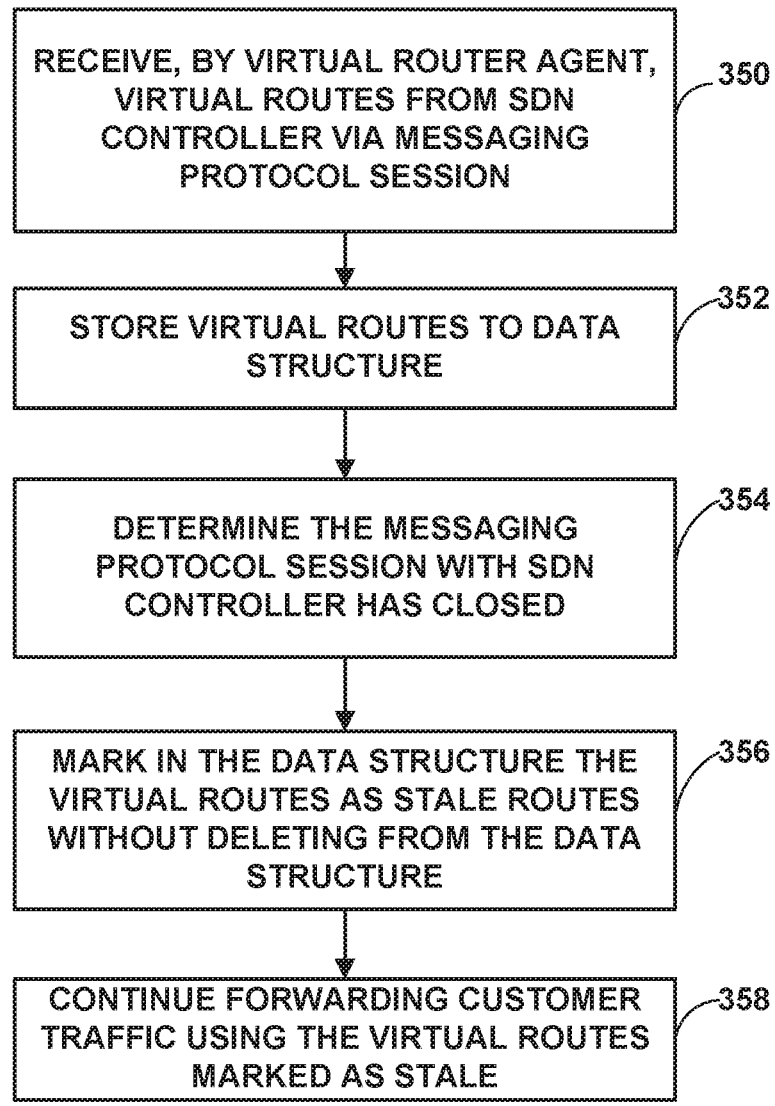

FIG. 7 is a flowchart illustrating example operation of network devices in accordance with the techniques of this disclosure. FIG. 7 will be described with reference to FIGS. 1-5 for purposes of example. A virtual router agent (e.g., VR agents 36, 84) managed by an SDN controller such as SDN controller 32 receives virtual routes from the SDN controller via a messaging protocol session (350), such as an XMPP session. The virtual router agent may also receive configuration information from the SDN controller via the messaging protocol session. The virtual router agent stores the virtual routes to a data structure, such as a forwarding information base (352) maintained in a forwarding plane of a compute node on which the virtual router agent executes. The virtual router agent determines the messaging protocol session with the SDN controller has closed (354), which may include detecting that communications have not been received over the messaging protocol session for a certain time period, and may be due to a control node of the SDN controller going down. In response to determining the messaging protocol session has closed, the virtual router agent marks the virtual routes in the data structure as stale routes without deleting the routes from the data structure (356). The virtual router agent continues to forward customer traffic using the stale virtual routes (358). The operations described above as being done by the virtual router agent may be performed by an XMPP process executing on a compute node, in some examples. In some examples, the above steps may be performed using an XMPP protocol of the virtual router agent by sending and receiving messages in accordance with an XMPP protocol on an XMPP session.

Example configuration for various aspects is described in U.S. Provisional Application No. 62/460,634, filed Feb. 17, 2017, the entire contents of which are incorporated by reference herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, processs or components may be implemented together or separately as discrete but interoperable logic devices. Depiction of different features as processs or units is intended to highlight different functional aspects and does not necessarily imply that such processs or units must be realized by separate hardware or software components. Rather, functionality associated with one or more processs or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A method comprising:
by a first network device operating as a messaging protocol client, receiving one or more virtual routes to virtual interfaces from a second network device operating as a messaging protocol server over a messaging protocol session between the first network device and the second network device;
storing, by the messaging protocol client, the one or more virtual routes to virtual interfaces to a data structure;
in response to determining that the messaging protocol session has closed, marking, by the messaging protocol client, the one or more virtual routes to virtual interfaces in the data structure as stale without deleting the one or more virtual routes to virtual interfaces from the data structure; and
subsequent to marking the indication of the one or more virtual routes to virtual interfaces as stale, advertising, by the first network device, the one or more virtual routes to virtual interfaces to messaging protocol clients of the first network device relative to which the first network device operates as a messaging protocol server.

2. The method of claim 1, further comprising:
prior to determining the messaging protocol session has closed:
sending, by the first network device, a first messaging protocol capability message to the second network device that indicates an amount of time the first network device may take to restart; and receiving, by the first network device, a second messaging protocol capability message from the second network device that indicates an amount of time the second network device may take to restart.

3. The method of claim 2, further comprising:

by the first network device, setting a time period for a timer associated with the messaging protocol session to be equal or greater than the amount of time indicated in the second messaging protocol capability message;

in response to determining the messaging protocol session has closed, starting the timer associated with the messaging protocol session; and in response to determining that the messaging protocol session has not re-opened before expiration of the timer, deleting, by the first network device, the one or more virtual routes from the data structure and stopping forwarding the customer traffic to the virtual interfaces.

4. The method of claim 1, further comprising subsequent to marking the indication of the one or more virtual routes as stale:

receiving, by the first network device via the messaging protocol session, a new set of one or more virtual routes to virtual interfaces from the second network device; and updating, by the first network device, the data structure based on the new set of one or more virtual routes to clear the stale marking on any of the one or more virtual routes that are also in the new set of one or more virtual routes.

5. The method of claim 4, further comprising:

receiving, by the first network device via the messaging protocol session, a message that indicates an end to the virtual routes being sent by the second network device;

in response to receiving the message that indicates the end to the virtual routes being sent by the second network device, deleting, by the first network device, any of the one or more virtual routes from the data structure that were not updated by the first network device.

6. The method of claim 1, further comprising:

in response to determining that all virtual routes have been sent to the second network device over the messaging protocol session, sending, by the first network device via the messaging protocol session, a message indicating an end to the virtual routes being sent by the first network device.

7. The method of claim 1, wherein marking the virtual routes as stale comprises marking the virtual routes as stale with the virtual routes remaining eligible for election as a best path by the first network device.

8. The method of claim 1, wherein the messaging protocol session comprises an Extensible Messaging and Presence Protocol (XMPP) session.

9. The method of claim 1, wherein the first network device comprises a compute node managed by a Software Defined Networking (SDN) controller, and wherein the second network device comprises the SDN controller.

10. A first network device comprising:

processing circuitry configured to execute a messaging protocol;

a plurality of virtual machines; and a forwarding plane comprising a plurality of forwarding information bases for the virtual machines, wherein the processing circuitry is configured to receive one or more virtual routes to virtual interfaces from a second network device via a messaging protocol session between the second network device and the first network device, wherein the processing circuitry is configured to store the one or more virtual routes to one or more of the plurality of forwarding information bases, wherein the processing circuitry is configured to mark, in response to determining the messaging protocol session has closed, the one or more virtual routes in the forwarding information bases as stale without deleting the one or more virtual routes from the data structure, wherein the processing circuitry is configured to, subsequent to marking the indication of the one or more virtual routes to virtual interfaces as stale, advertise the one or more virtual routes to virtual interfaces to messaging protocol clients of the first network device relative to which the first network device operates as a messaging protocol server.

11. The first network device of claim 10, wherein the processing circuitry is configured to:

prior to determining the messaging protocol session has closed:

send a first messaging protocol capability message to the second network device that indicates an amount of time the first network device may take to restart; and receive a second messaging protocol capability message from the second network device that indicates an amount of time the second network device may take to restart.

12. The first network device of claim 11, wherein the processing circuitry is configured to:

set a time period for a timer associated with the messaging protocol session to be equal or greater than the amount of time indicated in the second messaging protocol capability message;

in response to determining the messaging protocol session has closed, start the timer associated with the messaging protocol session; and in response to determining that the messaging protocol session has not re-opened before expiration of the timer, delete the one or more virtual routes from the forwarding information bases and stop forwarding the customer traffic to the virtual interfaces.

13. The first network device of claim 10, wherein the processing circuitry is configured to, subsequent to marking the indication of the one or more virtual routes as stale:

receive via the messaging protocol session, a new set of one or more virtual routes to virtual interfaces from the second network device; and update the forwarding information bases based on the new set of one or more virtual routes to clear the stale marking on any of the one or more virtual routes that are also in the new set of one or more virtual routes.

14. The first network device of claim 13, wherein the processing circuitry is configured to:

receive, via the messaging protocol session, a message that indicates an end to the virtual routes being sent by the second network device; and in response to receiving the message that indicates the end to the virtual routes being sent by the second network device, delete any of the one or more virtual routes from the forwarding information bases that were not updated by the processing circuitry.

15. The first network device of claim 10, wherein the processing circuitry is configured to:

in response to determining that all virtual routes have been sent to the second network device over the messaging protocol session, send, via the messaging protocol session, a message indicating an end to the virtual routes being sent by the first network device.

16. The first network device of claim 10, wherein the processing circuitry is configured to, in marking the virtual routes as stale, mark the virtual routes as stale with the virtual routes remaining eligible for election as a best path by the first network device.

17. The first network device of claim 10, wherein the messaging protocol session comprises an Extensible Messaging and Presence Protocol (XMPP) session.

18. The first network device of claim 10, wherein the first network device comprises a compute node managed by a Software Defined Networking (SDN) controller, and wherein the second network device comprises the SDN controller.

19. A method comprising:
by a first network device, receiving one or more virtual routes to virtual interfaces from a second network device managed by the first network device, the one or more virtual routes received via a first messaging protocol session between the first network device and the second network device;
storing, by the second network device, the one or more virtual routes to a data structure;
in response to determining the first messaging protocol session has closed, marking, by the second network device, the one or more virtual routes in the data structure as stale without deleting the one or more virtual routes from the data structure and without withdrawing the virtual routes from routing protocol peers of the second network device; and subsequent to marking the one or more virtual routes as stale, sending, by the second network device, the one or more virtual routes to a third network device over a second messaging protocol session between the second network device and the third network device, for which the second network device operates as a messaging protocol server and the third network device operates as a messaging protocol client of the second network device.

20. The method of claim 19, further comprising:

prior to determining the first messaging protocol session has closed, receiving, by the first network device, a messaging protocol capability message from the second network device that indicates an amount of time the second network device may take to restart;

by the first network device, setting a time period for a timer associated with the first messaging protocol session to be equal or greater than the amount of time indicated in the messaging protocol capability message;

in response to determining the first messaging protocol session has closed, starting the timer associated with the first messaging protocol session; and in response to determining that the first messaging protocol session has not re-opened before expiration of the timer, deleting, by the first network device, the one or more virtual routes from the data structure and withdrawing the one or more virtual routes from the routing protocol peers.

* * * * *